(12) United States Patent
Chia et al.

(10) Patent No.: US 10,731,591 B2
(45) Date of Patent: Aug. 4, 2020

(54) PRESSURE SENSOR OF A HIGH-PRESSURE INJECTION SYSTEM, CONTROL DEVICE, HIGH-PRESSURE INJECTION SYSTEM, AND MOTOR VEHICLE

(71) Applicant: CPT Group GmbH, Hannover (DE)

(72) Inventors: Tet Kong Brian Chia, Regensburg (DE); Dmitriy Kogan, Roding (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/340,225

(22) PCT Filed: Jun. 7, 2017

(86) PCT No.: PCT/EP2017/063881
§ 371 (c)(1),
(2) Date: Apr. 8, 2019

(87) PCT Pub. No.: WO2018/068908
PCT Pub. Date: Apr. 19, 2018

(65) Prior Publication Data
US 2020/0040837 A1 Feb. 6, 2020

(30) Foreign Application Priority Data
Oct. 13, 2016 (DE) .......................... 10 2016 219 954

(51) Int. Cl.
*F02D 41/30* (2006.01)
*F02D 41/20* (2006.01)
(Continued)

(52) U.S. Cl.
CPC ......... *F02D 41/3082* (2013.01); *F02D 41/20* (2013.01); *F02D 41/222* (2013.01);
(Continued)

(58) Field of Classification Search
CPC .... F02D 41/3082; F02D 41/20; F02D 41/222; F02D 2041/223; G01L 19/00; G01L 27/007
(Continued)

(56) References Cited

U.S. PATENT DOCUMENTS 7,933,712 B2   4/2011   Ishizuka et al. ............... 701/114
8,437,942 B2   5/2013   Nakata et al. ................. 701/103
(Continued)

FOREIGN PATENT DOCUMENTS

DE   10 2010 064 048 A1   6/2012   ............... F02D 1/00
DE   10 2012 203 283 A1   9/2013   ............. F02D 41/00
(Continued)

OTHER PUBLICATIONS

German Office Action, Application No. 10 2016 219 954.4, 6 pages, dated Dec. 5, 2016.
(Continued)

*Primary Examiner* — Mahmoud Gimie
(74) *Attorney, Agent, or Firm* — Slayden Grubert Beard PLLC

(57) ABSTRACT

Various embodiments include a method comprising: moving a piston toward TDC in successive pump cycles; during the movement, closing an inlet valve by applying current to an electromagnet; generating a pressure signal downstream of the outlet; applying a measurement current to the electromagnet when the inlet valve is closed; while the piston moves away from TDC, detecting an opening position at which an opening movement of the inlet valve begins on the basis of a predetermined change with respect to time of the measurement current; checking whether a value sequence of the ascertained opening positions over multiple pump cycles satisfies a predetermined discrepancy criterion with regard to the sensor signal; and if the discrepancy criterion is
(Continued)

satisfied, generating a fault signal relating to the pressure sensor.

11 Claims, 5 Drawing Sheets

(51) Int. Cl.
    *F02D 41/22*     (2006.01)
    *G01L 19/00*     (2006.01)
    *G01L 27/00*     (2006.01)

(52) U.S. Cl.
    CPC ............ *G01L 19/00* (2013.01); *G01L 27/007* (2013.01); *F02D 2041/223* (2013.01)

(58) Field of Classification Search
    USPC .......................................................... 701/103
    See application file for complete search history.

(56) References Cited

U.S. PATENT DOCUMENTS

| | | | |
|---|---|---|---|
| 8,738,218 B2 | 5/2014 | Suda et al. | 701/30.3 |
| 10,151,267 B2 | 12/2018 | Anetsberger et al. | |
| 2003/0046990 A1 | 3/2003 | Joos et al. | 73/114.44 |
| 2007/0051340 A1* | 3/2007 | Tsujimoto | F02D 41/221 |
| | | | 123/378 |
| 2009/0056677 A1 | 3/2009 | Nakata et al. | 123/480 |
| 2011/0022290 A1* | 1/2011 | Kaneko | F02D 41/222 |
| | | | 701/103 |
| 2012/0095669 A1* | 4/2012 | Katsurahara | F02D 41/221 |
| | | | 701/107 |
| 2015/0153242 A1 | 6/2015 | Jenne et al. | 73/1.69 |
| 2020/0040835 A1* | 2/2020 | Chia | G01M 15/08 |

FOREIGN PATENT DOCUMENTS

| | | | | |
|---|---|---|---|---|
| DE | 10 2012 223 645 B3 | 2/2014 | ............ | F02D 41/00 |
| DE | 10 2013 221 978 A1 | 4/2015 | ............ | F02D 41/22 |
| DE | 10 2014 206 442 A1 | 10/2015 | ............ | F02D 41/38 |
| EP | 2 998 554 A1 | 3/2016 | ............ | F02D 41/22 |
| JP | H04-272445 A | 9/1992 | ............ | F02D 41/22 |
| WO | 01/55573 A2 | 8/2001 | ............ | F02D 41/24 |
| WO | 2011/046074 A1 | 4/2011 | | |
| WO | 2018/068908 A1 | 4/2018 | ............ | F02D 41/20 |

OTHER PUBLICATIONS

International Search Report and Written Opinion, Application No. PCT/EP2017/063881, 20 pages, dated Oct. 6, 2017.
Korean Office Action, Application No. 2020025444940, 6 pages dated Apr. 4, 2020.

\* cited by examiner

PRESSURE SENSOR OF A HIGH-PRESSURE INJECTION SYSTEM, CONTROL DEVICE, HIGH-PRESSURE INJECTION SYSTEM, AND MOTOR VEHICLE

CROSS-REFERENCE TO RELATED APPLICATIONS

This application is a U.S. National Stage Application of International Application No. PCT/EP2017/063881 filed Jun. 7, 2017, which designates the United States of America, and claims priority to DE Application No. 10 2016 219 954.4 filed Oct. 13, 2016, the contents of which are hereby incorporated by reference in their entirety.

TECHNICAL FIELD

The present disclosure relates to sensors. Various embodiments include methods for checking a pressure sensor such as may be provided in a high-pressure injection system of an internal combustion engine of a motor vehicle, including identifying a defective or faulty pressure sensor is identified by means of the method.

BACKGROUND

In a motor vehicle, a fuel for an internal combustion engine can be conveyed or pumped by means of a high-pressure injection system. A high-pressure injection system of this kind has a high-pressure pump which can convey the fuel toward the internal combustion engine on a high-pressure side with a pressure of greater than 200 bar. The fuel pump can have a piston which is moved back and forth between a bottom dead center and a top dead center in a compression chamber or swept volume. To this end, the piston can be driven, for example, by an engine shaft of the internal combustion engine. A complete cyclical movement of the piston is referred to as the pump cycle here.

As part of the piston movement from the top dead center to the bottom dead center, an opening movement of an inlet valve of the high-pressure pump begins, in each pump cycle, starting from a specific opening position of the piston. This is then the beginning of an intake phase in which fuel or, in general, a fluid flows into the compression chamber through the inlet valve. After the bottom dead center is reached, the intake phase ends and the piston is moved back toward the top dead center.

During this expulsion phase, the fluid is expelled from the compression chamber again by the movement of the piston toward the top dead center. Provided that the inlet valve is open in this case, the fluid flows back to a low-pressure side through the inlet valve. Therefore, the inlet valve is closed by a control device by current being applied to an electromagnet during the movement of the piston toward the top dead center. This occurs at a piston position which is dependent on a setpoint value for the fluid pressure to be adjusted to on the high-pressure side. The electromagnet to which current is applied magnetically attracts an armature which is connected to the inlet valve, so that said valve is carried along. When the inlet valve is closed, the fluid is no longer expelled through the inlet valve, but rather through an outlet valve, owing to the piston movement. The outlet valve may be, for example, a non-return valve. The fluid which is expelled through the outlet valve generates the fluid pressure on the high-pressure side downstream of the outlet valve.

Downstream of the outlet valve, there is arranged a pressure sensor which generates a sensor signal which is intended to indicate the fluid pressure. In a manner dependent on the sensor signal, the control device can then specifically set said piston position for the closing of the inlet valve, that is to say for the application of current to the electromagnet during the expulsion phase, and hereby adjust the fluid pressure to the setpoint pressure or setpoint value. This however assumes that the sensor signal of the pressure sensor correctly signals the fluid pressure. By contrast, if the pressure sensor is defective and always signals too low a pressure by means of the signal sensor, for example a zero signal, then the control device will always further increase the actual fluid pressure, because there is no resulting reduction in the control deviation (setpoint value minus sensor signal). This can lead to damage to the high-pressure injection system, for example to bursting or rupturing of a fluid line or of a seal.

SUMMARY

The present disclosure describes various methods and system for monitoring the functionality of the pressure sensor of the high-pressure injection system.

The object is achieved by means of the subjects of the independent patent claims. Advantageous developments of the invention are described by the dependent patent claims, the following description and the figures.

BRIEF DESCRIPTION OF THE DRAWINGS

An exemplary embodiment of the teachings herein is described below. To that end, in the figures.

DETAILED DESCRIPTION

Figure 1:
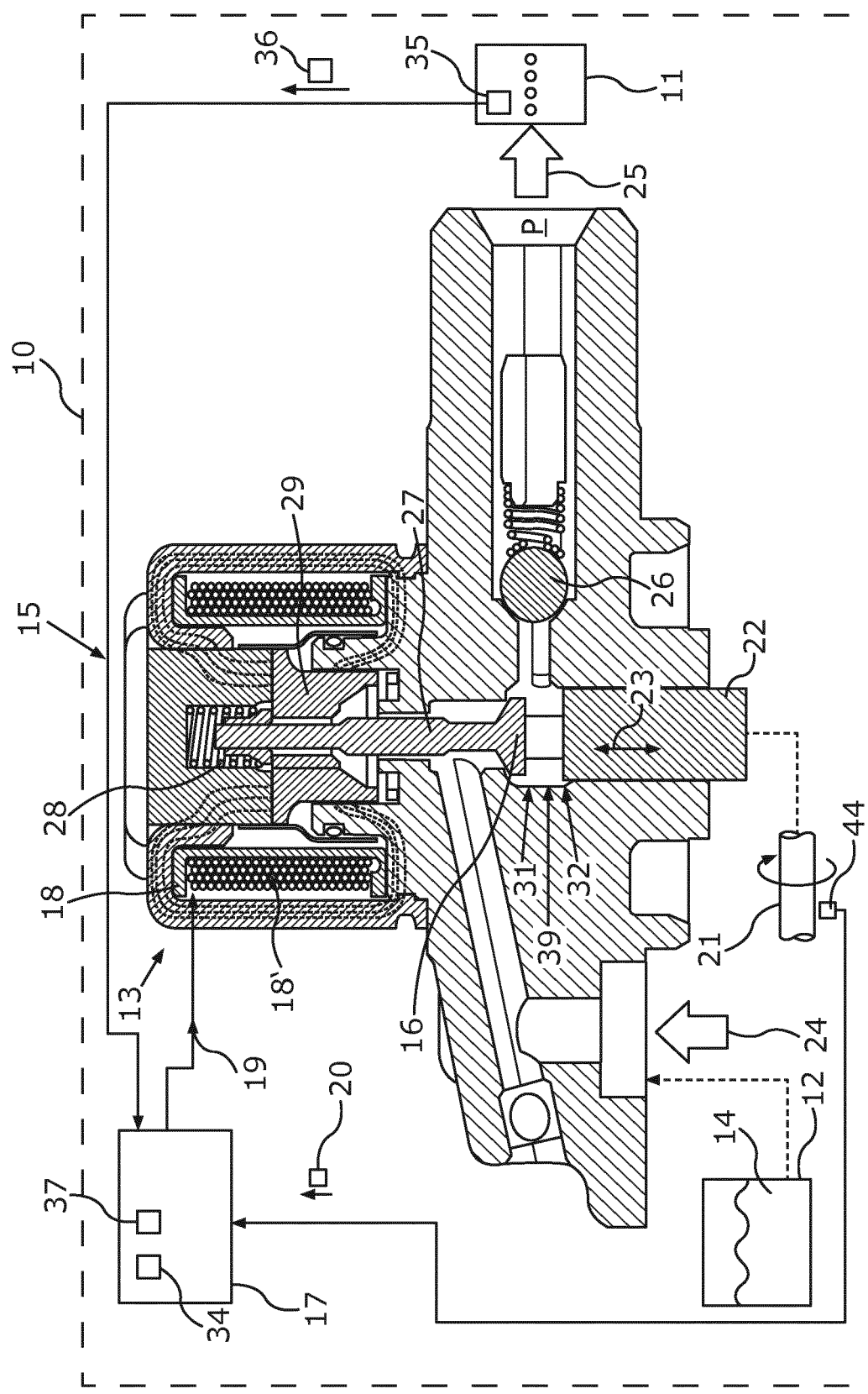
FIG. 1 shows a schematic illustration of an embodiment of the motor vehicle incorporating teachings of the present disclosure.

In some embodiments, a method starts at the point after the inlet valve has been closed by the control device in order to redirect the fluid through the outlet valve. After the inlet valve is closed, the current can normally be switched off again by the electromagnet since enough pressure builds up in the compression chamber in order to keep the inlet valve closed. In this case, the pressure is also then high enough when the piston, after reaching the top dead center, is moved away from said top dead center again and toward the bottom dead center. This is due to the fact that, in the compression chamber, the remaining fluid or fluid still present is elastically compressed while the piston is at the top dead center. If the piston moves away from the top dead center, the fluid initially expands, but it still exerts a sufficiently high pressure on the inlet valve in order to keep said inlet valve closed. The opening movement of the inlet valve therefore begins only when the piston has already moved away from the top dead center and has reached said opening position which is specifically distinguished in that the pressure in the compression chamber has become lower than a pressure force which is exerted on the inlet valve by a valve spring of the high-pressure pump and by the fluid of the low-pressure side which is located upstream on the other side of the inlet valve.

In some embodiments, a measurement current is now nevertheless applied to or caused to flow through the electromagnet by the control device with the inlet valve closed, even though this is not necessary for keeping the inlet valve closed. While the piston is moved away from the top dead center, on the basis of a predetermined change with respect to time of said measurement current, the opening position of the piston is detected, that is to say that position of the piston at which the opening movement of the inlet valve toward its open position begins. The measurement current changes because the movement of the inlet valve also moves the armature of the electromagnet, and in this way an electrical voltage is induced in the coil of the electromagnet, which electrical voltage superposes an additional induction current on the applied measurement current.

This detection of the change with respect to time of the measurement current is performed repeatedly over multiple pump cycles, such that the value of the opening position of the piston is ascertained for each pump cycle. A sequence of values, or, for short, a value sequence, of the ascertained opening positions is thus formed, in each case one value per pump cycle. It is checked whether this value sequence of the ascertained opening positions satisfies a predetermined discrepancy criterion with regard to the sensor signal of the pressure sensor. If the discrepancy criterion is satisfied, then a fault signal relating to the pressure sensor is generated. If the discrepancy criterion is satisfied, this is signaled as a defect or fault of the pressure sensor.

In some embodiments, said opening position of the piston is dependent on the fluid pressure prevailing downstream of the outlet valve. The higher the fluid pressure, the greater the distance of the opening position from top dead center. Thus, if the fluid pressure is successfully increased by means of the high-pressure pump, it would be necessary firstly for the sensor signal to correspondingly change. Secondly, however, the opening position is also shifted or changed with increasing fluid pressure. This is correspondingly indicated by the value sequence of the ascertained opening positions. The value sequence thus describes the profile with respect to time of the fluid pressure. By comparing the value sequence or a trend or a profile with respect to time of the value sequence with the sensor signal, it is thus possible to check whether the sensor signal has a profile with respect to time whose form corresponds with the form of the profile with respect to time of the value sequence. If this is not the case, then this indicates that the profile with respect to time of the fluid pressure is not being described by the sensor signal. A fault signal must thus be generated.

In order, by means of the discrepancy criterion, to identify the described difference between the value sequence and the sensor signal, the discrepancy criterion may comprise that the value sequence signals a shift of the opening position away from the top dead center and thus a rising pressure profile of the fluid pressure and the sensor signal of the pressure sensor deviates from the pressure profile by more than a predetermined tolerance value. For example, a relative change of the value sequence over time may be compared with a corresponding relative change of the sensor signal. Thus, for example, if the value sequence increases by a predetermined percentage over time, for example by 200% or 300%, and if there is no resulting corresponding increase of the sensor signal, then a fault is present. Here, a correction factor may be provided, because the increase of the pressure need not imperatively be proportional to the shift of the opening position.

In some embodiments, a delta step change, that is to say a change by a predetermined absolute or relative value, is signaled by the control device. The delta step change is signaled if a difference of the sensor signal relative to the value sequence of greater than a predetermined delta value (absolute or relative) is identified on the basis of a difference signal. Proceeding from the start of the measurement or from the preceding delta step change, every instance of another resulting change by the delta value is thus signaled.

In some embodiments, to compensate noise contained in the value sequence, the detection is made more robust in that the control device counts, by means of a counter, how often a delta step change is identified in succession. Here, the discrepancy criterion comprises that the counter is greater than a predetermined minimum number. It is thus necessary for at least one delta step change or at least 2 or at least 3 delta step changes or a predetermined minimum number of delta step changes greater than 3, to be present in order for the fault signal to be detected in the first place. Otherwise, an "OK" signal can be generated, which signals a functional pressure sensor. In some embodiments, the detection may be made even more robust in that the discrepancy criterion also takes into consideration whether a rotational speed of an engine shaft, which drives the piston, of the internal combustion engine must be greater than a predetermined operating value. In this way, it is identified whether the high-pressure pump is being driven at all, that is to say is in operation.

A further possibility check arises by virtue of the discrepancy criterion comprising that a volume flow sensor signals a volume flow of the fluid greater than a predetermined minimum delivery value. In this way, it is identified whether fluid is being conveyed by the high-pressure pump at all. The measurement of the value sequence of the opening positions and the subsequent checking of the discrepancy criterion is preferably performed or initiated when, upon a start of the internal combustion engine, the sensor signal has a constant profile in accordance with a predetermined constancy criterion. The constancy criterion may for example provide for the sensor signal to vary, over time, around a predetermined constant value (for example zero) within a tolerance range or for the sensor signal to permanently signal the same value. This indicates an electrical defect which results in the pressure sensor remaining nonoperational.

As already stated, after the closure of the inlet valve, it is no longer necessary for currents to be applied to the electromagnet of the high-pressure pump, because the pressure in the compression chamber holds the inlet valve closed until such time as the piston has reached the opening position. In order that the normal operation of the control device is not impaired by the measurement current, the measurement current should not artificially shift the opening position as a result of the inlet valve being held closed by the measurement current. Correspondingly, provision is preferably made for a current intensity of the measurement current to be set to be lower than is provided for the closing of the inlet valve. The measurement current thus differs from the closing current provided for closing the inlet valve.

A further aspect is the question of how the opening position can be identified in the first place on the basis of the change with respect to time of the measurement current. As already stated, the opening movement of the inlet valve generates an induction current in the electrical coil of the electromagnet, which induction current is superposed on that component of the measurement current which is imparted by the control device. The result is an increase of the measurement current. To detect the opening movement, it is therefore checked whether a predetermined mean value of the measurement current increases. If the measurement current imparted by the control device is set for example by means of pulse width modulation, a mean value obtained is for example the value of the measurement current that can be formed over one or two or more than two periods of the pulse width modulation.

In order, in the event of an opening movement being detected, to describe the opening position of the piston with one value, provision may be made in particular for the opening position to be ascertained by means of a rotational position sensor of the internal combustion engine. It is thus possible to ascertain the rotational position of the engine shaft that drives the piston. The rotational position value is sufficiently informative. An absolute distance value of the opening position in relation to top dead center is not necessary. It is sufficient to ascertain a relative change of the opening position and thus of the rotational position in order to identify a defective pressure sensor in the described manner.

In some embodiments, a control device for a high-pressure injection system of an internal combustion engine of a motor vehicle is configured to execute the methods described herein. The control device is configured to, in the described manner, close the inlet valve of the high-pressure pump of the high-pressure injection system in a manner dependent on the sensor signal of the pressure sensor in order to adjust the fluid pressure to a setpoint value. The control device is designed to implement the described method steps of the control device incorporating the teachings herein.

Equipping a high-pressure injection system with the control device produces an embodiment of the high-pressure injection system incorporating the teachings herein. Furthermore, the high-pressure injection system has a high-pressure pump and a pressure sensor arranged downstream of an outlet valve of the high-pressure pump. The disclosure also describes a motor vehicle which has the described internal combustion engine and an embodiment of the high-pressure injection system according to the invention.

The exemplary embodiment explained below is an example embodiment incorporating the teachings herein. In the exemplary embodiment, the described components of the embodiment each constitute individual features which should be considered independently of one another and which in each case also develop the teachings independently of one another and should therefore also be regarded as a constituent part of the teachings individually or in a different combination to that shown. Furthermore, the embodiment described is also able to be supplemented by further features of the disclosure from among those that have already been described. In the figures, functionally identical elements are provided in each case with the same reference signs.

FIG. 1 shows a motor vehicle 10, which may be, for example, an automobile, such as a passenger car or truck for example. The motor vehicle 10 may have an internal combustion engine 11 which can be coupled to a fuel tank 12 by means of a high-pressure injection system 13. A fluid 14 which is contained in the fuel tank 12, that is to say a fuel for example, such as diesel or petrol for example, can be conveyed to the internal combustion engine 11 by means of the high-pressure injection system 13.

To this end, the high-pressure injection system 13 can have a high-pressure pump 15 comprising an inlet valve 16 and a control device 17 for controlling an electromagnet 18 of the inlet valve 16. The control device 17 can adjust a coil current 19 which flows through an electrical coil 18' of the electromagnet 18. The control device can adjust the coil current 19 depending on a rotational position signal 20 which describes or signals a rotational position of an engine shaft 21 of the motor vehicle 10. The engine shaft 21 can be coupled, for example, to a crankshaft of the internal combustion engine 11. The engine shaft 21 may also be the crankshaft itself. A piston 22 of the high-pressure pump 15 is also driven by the engine shaft 21 to perform a piston movement 23 in a compression chamber 33. The piston movement 23 moves the piston back and forth between a top dead center 31 and a bottom dead center 32 in pump cycles. The fluid 14 is conveyed from a low-pressure side, which is at a low pressure 24, of the high-pressure pump 15 to a high-pressure side, which is at a high pressure 25, by the piston movement 23 of the piston 22. In the process, the fluid 14 flows through the inlet valve 16 and an outlet valve 26.

In the process, a pin 27 of the inlet valve 16 is moved by means of the coil current 19 by current being applied to the coil 18' of the electromagnet 18. In this case, a valve spring 28 counteracts the magnetic force of the electromagnet 18 and in this way pushes the pin 27 toward an open position, as is shown in FIG. 1. By adjustment of the coil current 19, the spring force of the valve spring 28 is overcome and an armature 29 with the pin 27 fastened to it is moved counter to the spring force of the valve spring 28, and the inlet valve 16 is closed in this way.

The respective time at which the control device 17 closes the inlet valve 16 by applying current to the electromagnet 18 in each pump cycle is defined by a regulator 34 of the control device 17, which regulator can receive a sensor signal 36 from a pressure sensor 35, which sensor signal signals a current fluid pressure of the fluid in a part of the high-pressure injection system 13 which is positioned downstream of the outlet valve 16. Therefore, a fluid pressure P of the high-pressure side 25 is signaled by the pressure sensor 35 and the control device 17 can adjust the fluid pressure P to a setpoint value 37 by adjusting the time for closing the inlet valve 16. However, this assumes that the sensor signal 36 actually corresponds to the fluid pressure P.

Figure 2:
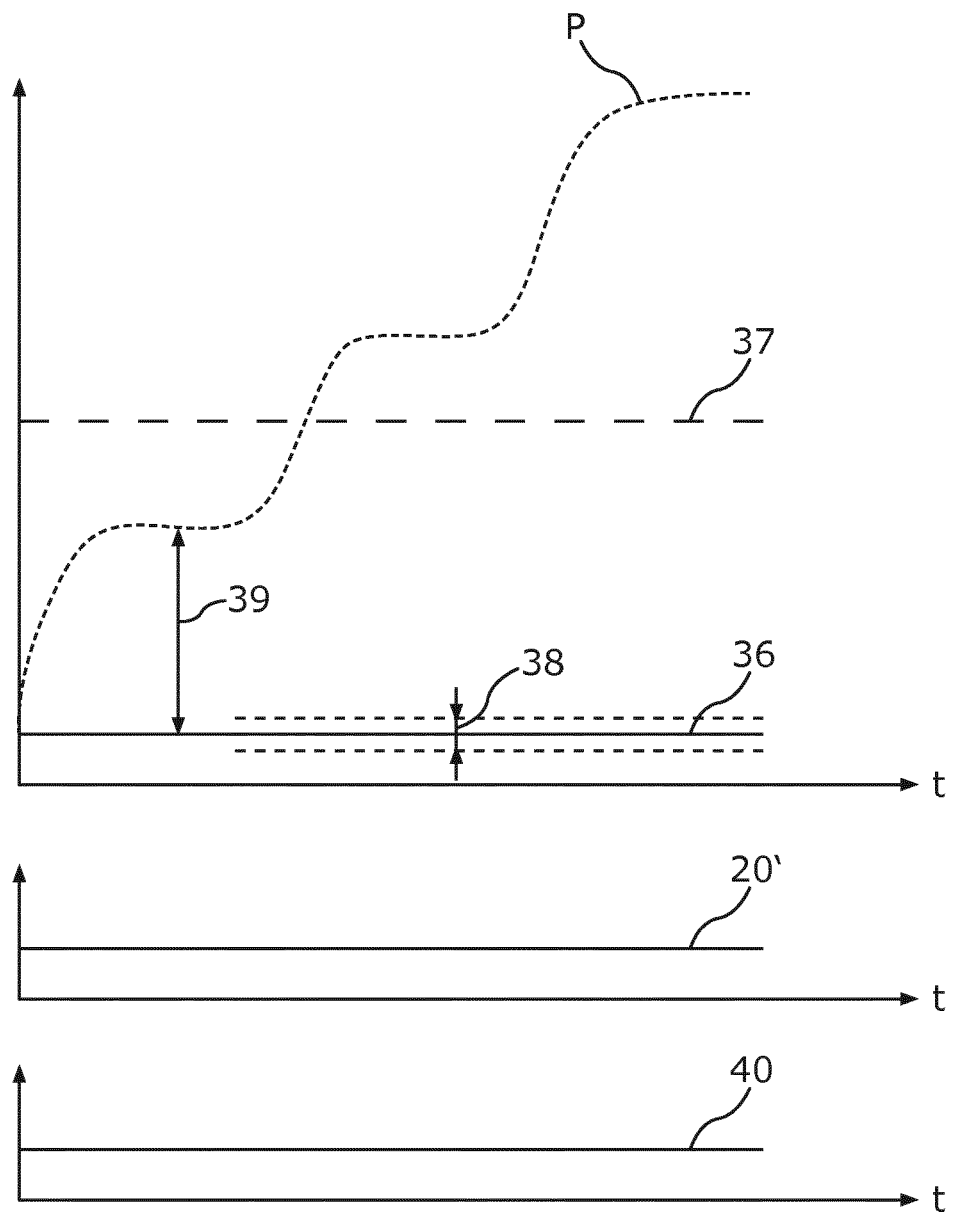
FIG. 2 shows diagrams with schematic profiles of signals such as may arise during the operation of the motor vehicle of FIG. 1 in the event of a defect of a pressure sensor.

FIG. 2 illustrates a sequence that may arise in the case of a defective pressure sensor 35. The sensor signal 36, the setpoint value 37 and the fluid pressure P resulting from the operation of the high-pressure pump 15 are illustrated, versus the time t, as profiles with respect to time. If the pressure sensor 35 has failed, the sensor signal 36 no longer signals the fluid pressure P but rather remains constant, or within a tolerance range 38 if noise is present in the sensor signal 36. By contrast, the fluid pressure P increases, such that, over the time t, a discrepancy or a difference of greater than a delta value 39 in relation to the sensor signal 36 arises.

FIG. 2 furthermore shows how, by means of the control device 17, from the rotational position signal 20, a signal of the rotational speed 20' can be generated which signals that the piston 22 is actually being driven by the engine shaft 21. Furthermore, a volume flow sensor (not illustrated) may signal a volume flow 40, which indicates whether the high-pressure pump 15 is successfully conveying the fluid 14. The control device 17 may now be configured to estimate the profile with respect to time of the fluid pressure P, as illustrated in FIG. 2.

Figure 3:
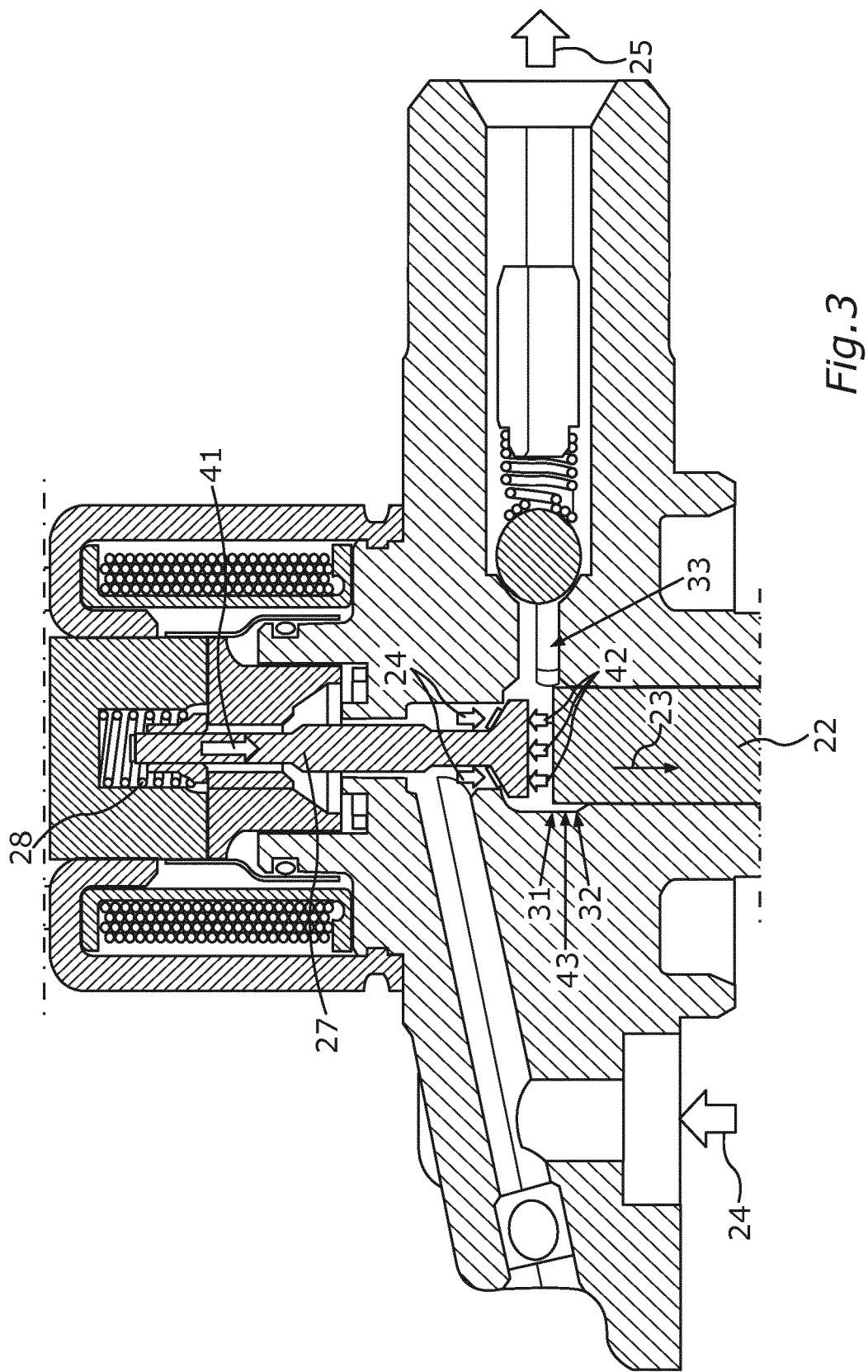
FIG. 3 shows a schematic illustration of a high-pressure pump of the motor vehicle from FIG. 1.

FIG. 3 illustrates the underlying measurement principle. To this end, FIG. 3 shows how the pin 27 is held in the illustrated closed position of the inlet valve 16 even when there is no coil current 19 flowing. The reason for this is that the low pressure 24 together with a spring force 41 of the valve spring 28 is lower than a pressure force 42 of the compressed fluid 14 in the compression chamber 33 even after the top dead center 31 is overshot. The piston 22 first has to reach a predetermined opening position 43 between the top dead center 31 and the bottom dead center 32, so that the fluid 14 in the compression chamber 33 is expanded to a sufficient extent that the pressure in the compression chamber 33 produces a pressure force 42 which is low enough to move the pin 27 from the closed position, shown in FIG. 3, toward the open position, shown in FIG. 1, by means of the spring force 41 and the low pressure 24.

Figure 4:
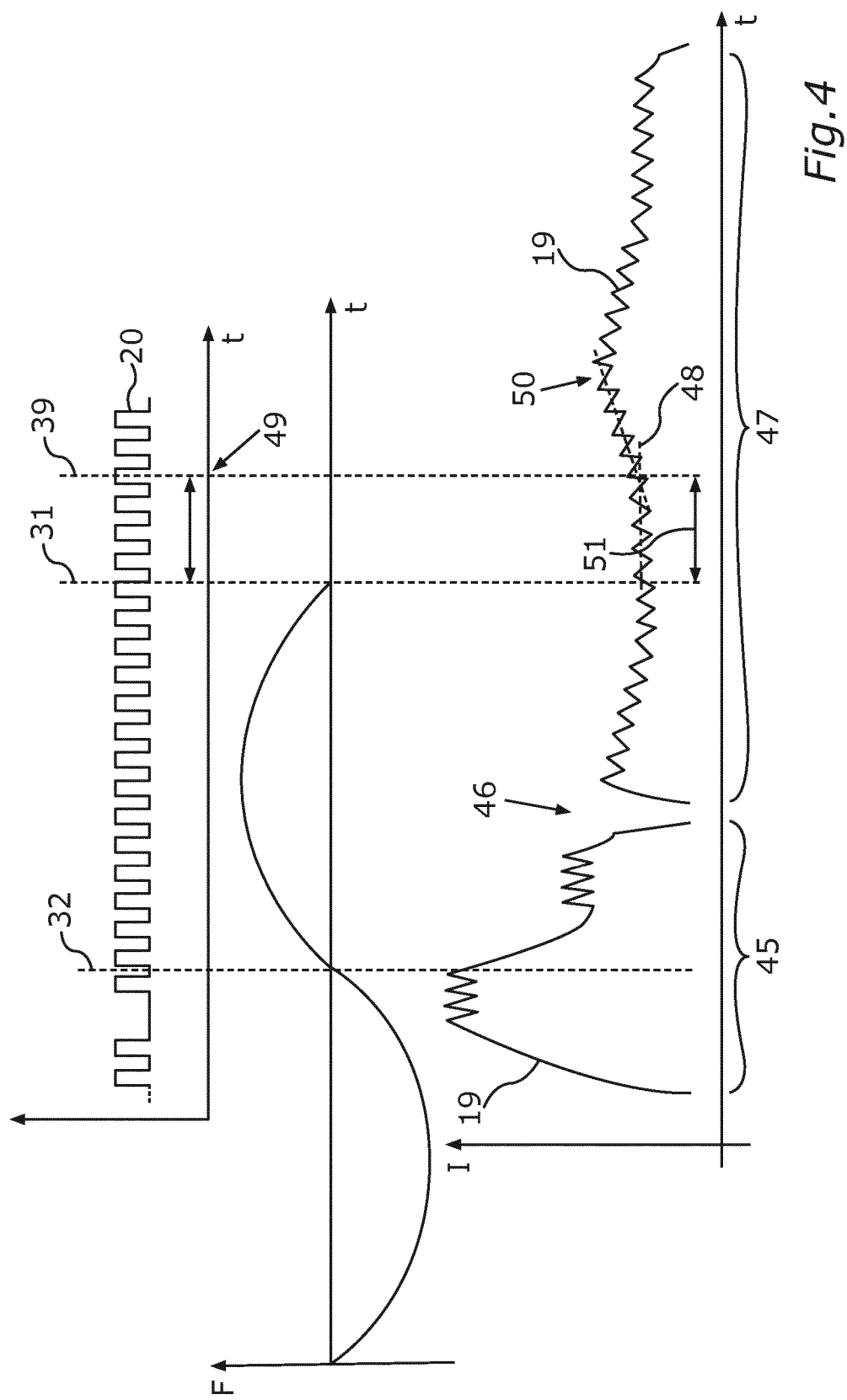
FIG. 4 shows diagrams with schematic profiles of signals, on the basis of which an opening position of a piston of the high-pressure pump of FIG. 4 can be ascertained.

FIG. 4 shows how, firstly, the starting of this opening movement of the inlet valve 16, that is to say of the pin 27 of said inlet valve, can be identified by the control device 17 and how, secondly, starting from this point, it is possible to infer the associated opening position 43. Here, FIG. 4 illustrates, versus the time t, firstly the fluid flow F, the rotational position signal 20 which can be generated by a rotational position encoder 44 for example as a pulse sequence, and a profile with respect to time of the coil current 19. In the example illustrated in FIG. 4, it is assumed that there should be no return flow through the inlet valve 16, but rather that the inlet valve 16 is closed at the bottom dead center 32 by adjustment of a current profile 45 for the coil current 19. The current profile 45 yields a closing current. This situation arises if the control device 17 seeks, on the basis of a difference between the sensor signal 36 and the setpoint value 37, to adjust the fluid pressure P to the setpoint value 37 with a maximum rate of change.

After the ending of the current profile 45, the coil current 19 can be switched off in a switching interval 46. The coil current 19 can then be switched on again with a measurement profile 47 by the control device 17 while the inlet valve 16 is still closed, wherein the measurement profile 42 produces a current intensity I which is lower than the current intensity I of the current profile 45 for closing the inlet valve 16. A measurement current therefore results.

After the top dead center 31 has been passed by the piston 22, a mean value 48 of the current intensity I of the coil current 19 remains constant or within a predetermined tolerance range until such time as a starting of the opening movement of the pin 27 of the inlet valve 16 occurs at a start time 49. The piston has then reached its present opening position 43. At the opening position 43, a force balance is equalized as described in FIG. 3. In other words, the inlet valve 16 opens at the start time 49 when the spring force 38 and the hydraulic force of the low pressure 24 together are greater than the hydraulic pressure force 42 in the compression chamber 33. This occurs when the pressure in the compression chamber 33, that is to say in the free dead volume of said compression chamber, has reduced owing to the piston movement 23 in the direction of the bottom dead center 32.

The opening movement of the pin 27 and the armature 29 induces an additional induction current in the electrical coil 18', this additional induction current leading to an increase 50 in the effective value or mean value 48. The start of this increase 50 constitutes a predetermined or known change with respect to time. By comparing the mean values 48 of successive times, it is possible, by means of the control device 17, to detect the starting time 49 at which the piston is in the opening position 43. The starting time 49 may be specified as an angular value of the rotational position signal 20. The starting time 49 is thus a description of the opening position 43 of the piston.

A distance 51 of the opening position 49 from the top dead center 31 is dependent on the fluid pressure P. Without the need for the distance 51 to be known precisely, a relative change of the opening position 43 is sufficient to identify a change of the fluid pressure P.

Figure 5:
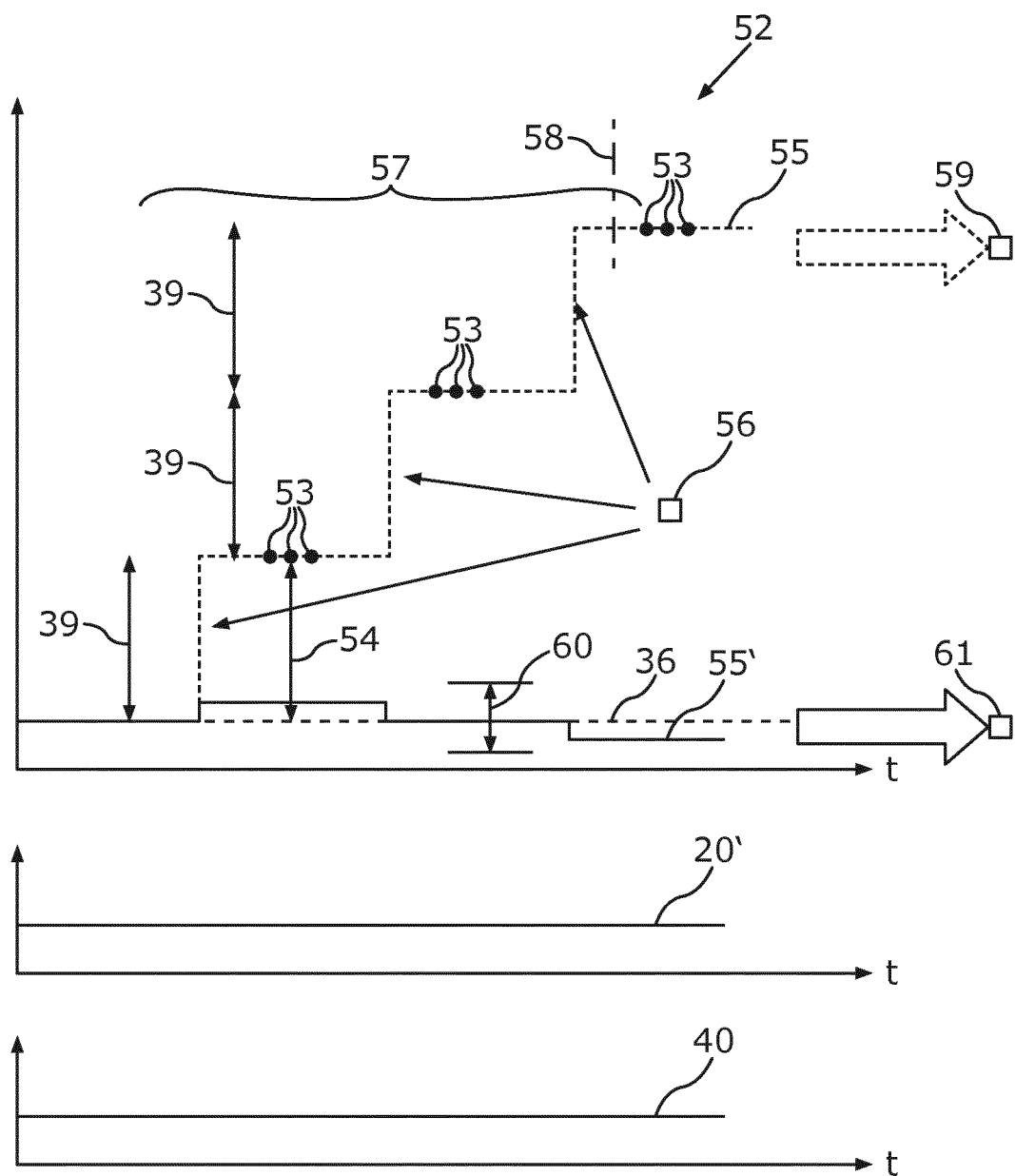
FIG. 5 shows diagrams with schematic profiles of signals as can be ascertained by means of a control device in the motor vehicle of FIG. 1.

FIG. 5 illustrates how, from this, a discrepancy criterion 52 can be formed which can be checked by means of the control device 17. A present value 53 of the opening position 49 can be ascertained in each case over multiple pump cycles. The difference 54 in relation to the sensor signal 36 yields a difference signal 55. It is assumed in the present case that the sensor signal 36 has the value zero.

In the case of a defective pressure sensor 35, the fluid pressure P increases (as illustrated in FIG. 2), whereas the sensor signal remains constant. The difference 54, that is to say the difference signal 55, thus exceeds the delta value 39 after a number of pump cycles. If the fluid pressure P increases further, the delta value 39 is thus exceeded several times in succession, wherein an exceedance signal can signal a delta step change 56 every time. Here, a number 57 of exceedances may be counted. If the number 57 of delta step changes 56 is greater than a predefined threshold value 58 (in FIG. 5, the threshold value 58 is the value 3), then a fault signal 59 may be generated or output, which signals a defective pressure sensor 35.

FIG. 5 also illustrates, as an alternative to this, a difference signal 55' such as would result if the sensor signal 36 were to exhibit the profile of the fluid pressure P illustrated in FIG. 2, such that a difference signal 55' of the sensor signal 36 in relation to the value sequence 53 lies within a tolerance range 60. An "OK" signal 61 can then be generated, which signals that the pressure sensor 36 is functioning correctly. The check of the pressure sensor 35 in the described manner may be performed for example upon a start of the internal combustion engine 11 if it is to be expected that a pressure increase in the case of a functioning high-pressure pump 15 is particularly great (from ambient pressure to high pressure 25). Then, the shift of the open position 43 can be detected particularly clearly.

What is claimed is:

1. A method for checking a pressure sensor of a high-pressure injection system of an internal combustion engine of a motor vehicle, the method comprising:
    moving a piston toward a top dead center within a compression chamber of a high-pressure pump in successive pump cycles during an expulsion phase, expelling a fluid from the compression chamber;
    during movement of the piston toward top dead center, closing an inlet valve using a control device by applying current to an electromagnet, wherein the expelled fluid generates a fluid pressure downstream of the outlet valve in a high-pressure region;
    generating a pressure signal using the pressure sensor arranged downstream of the outlet valve;
    applying a measurement current to the electromagnet using the control device when the inlet valve is closed;
    while the piston moves away from top dead center, detecting an opening position of the piston at which an opening movement of the inlet valve begins on the basis of a predetermined change with respect to time of the measurement current;
    checking whether a value sequence of the ascertained opening positions over multiple pump cycles satisfies a predetermined discrepancy criterion with regard to the sensor signal; and
    if the discrepancy criterion is satisfied, generating a fault signal relating to the pressure sensor.

2. The method as claimed in claim 1, wherein the discrepancy criterion corresponds to an indication based on the value sequence that the opening position shifts away from the top dead center and thus a rising pressure profile of the fluid pressure and the sensor signal of the pressure sensor deviates from the pressure profile by more than a predetermined tolerance value.

3. The method as claimed in claim 1, further comprising indicating a delta step change with the control device if a difference of the sensor signal relative to the value sequence of greater than a predetermined delta value is identified on the basis of a difference signal.

4. The method as claimed in claim 3, further comprising counting with the control device how often a delta step change is identified in succession; and
wherein the discrepancy criterion comprises a count greater than a predetermined minimum number.

5. The method as claimed in claim 1, wherein the discrepancy criterion indicates a rotational speed of an engine shaft driving the piston greater than a predetermined operating value.

6. The method as claimed in claim 1, wherein the discrepancy criterion indicates a volume flow of the fluid greater than a predetermined minimum delivery value.

7. The method as claimed in claim 1, further comprising ascertaining the value sequence and checking the discrepancy criterion if, upon a start of the internal combustion engine, the sensor signal has a constant profile in accordance with a predetermined constancy criterion.

8. The method as claimed in claim 1, further comprising setting a current intensity of the measurement current lower than is provided for the closing of the inlet valve.

9. The method as claimed in claim 1, wherein the predetermined change with respect to time of the measurement current for the detection of the opening movement indicates a predetermined mean value of the measurement current increases.

10. The method as claimed in claim 1, wherein ascertaining the opening position includes monitoring a rotational position sensor of the internal combustion engine.

11. A control device for a high-pressure injection system of an internal combustion engine of a motor vehicle, the control device comprising:
a processor; and
a memory storing a set of instructions, the set of the instructions, when loaded and executed by the processor, causing the processor to:
close an inlet valve of a high-pressure pump of the high-pressure injection system in a manner dependent on a sensor signal of a pressure sensor;
move a piston toward a top dead center within a compression chamber of a high-pressure pump in successive pump cycles during an expulsion phase, expelling a fluid from the compression chamber;
during movement of the piston toward top dead center, close an inlet valve using a control device by applying current to an electromagnet, wherein the expelled fluid generates a fluid pressure downstream of the outlet valve in a high-pressure region;
generate a pressure signal using the pressure sensor arranged downstream of the outlet valve;
apply a measurement current to the electromagnet using the control device when the inlet valve is closed;
while the piston moves away from top dead center, detect an opening position of the piston at which an opening movement of the inlet valve begins on the basis of a predetermined change with respect to time of the measurement current;
check whether a value sequence of the ascertained opening positions over multiple pump cycles satisfies a predetermined discrepancy criterion with regard to the sensor signal; and
if the discrepancy criterion is satisfied, generate a fault signal relating to the pressure sensor.

* * * * *